U. WEDGE.
CULTIVATOR.
APPLICATION FILED JAN. 22, 1918.
1,317,533.
Patented Sept. 30, 1919.
2 SHEETS—SHEET 1.
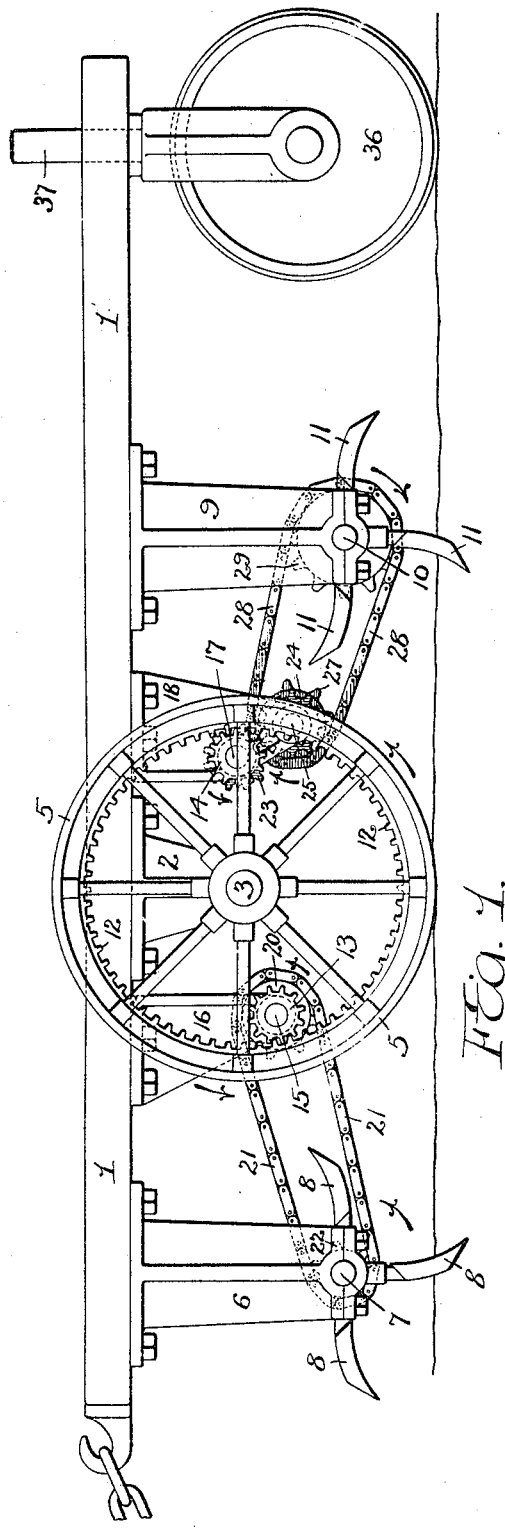
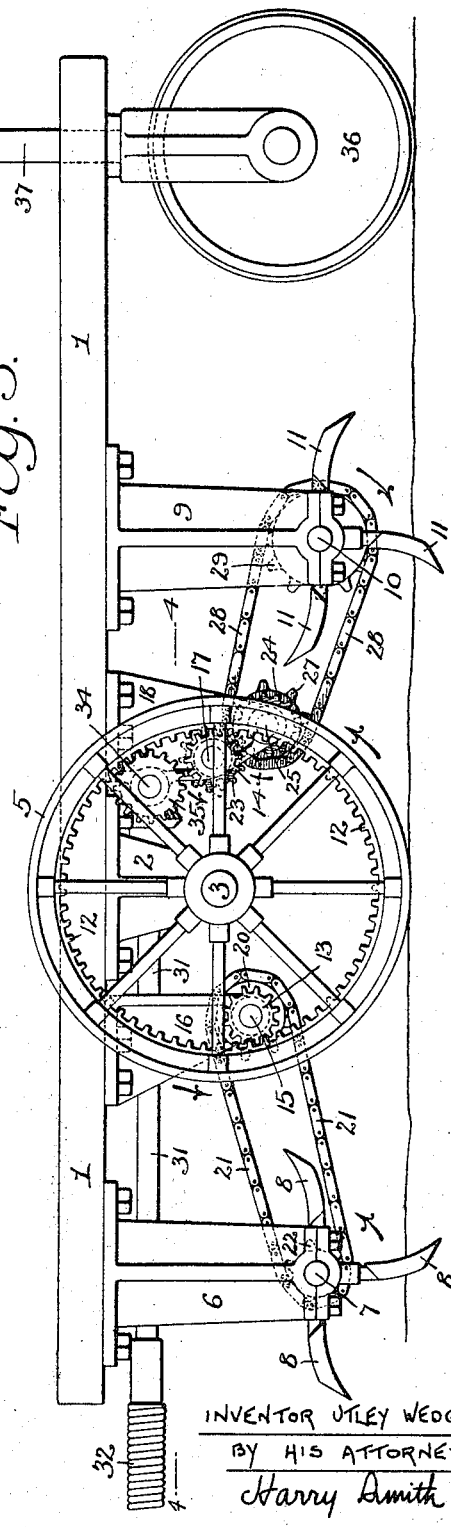
INVENTOR UTLEY WEDGE
BY HIS ATTORNEY
Harry Smith U. WEDGE.
CULTIVATOR.
APPLICATION FILED JAN. 22, 1918.
1,317,533.
Patented Sept. 30, 1919.
2 SHEETS—SHEET 2.
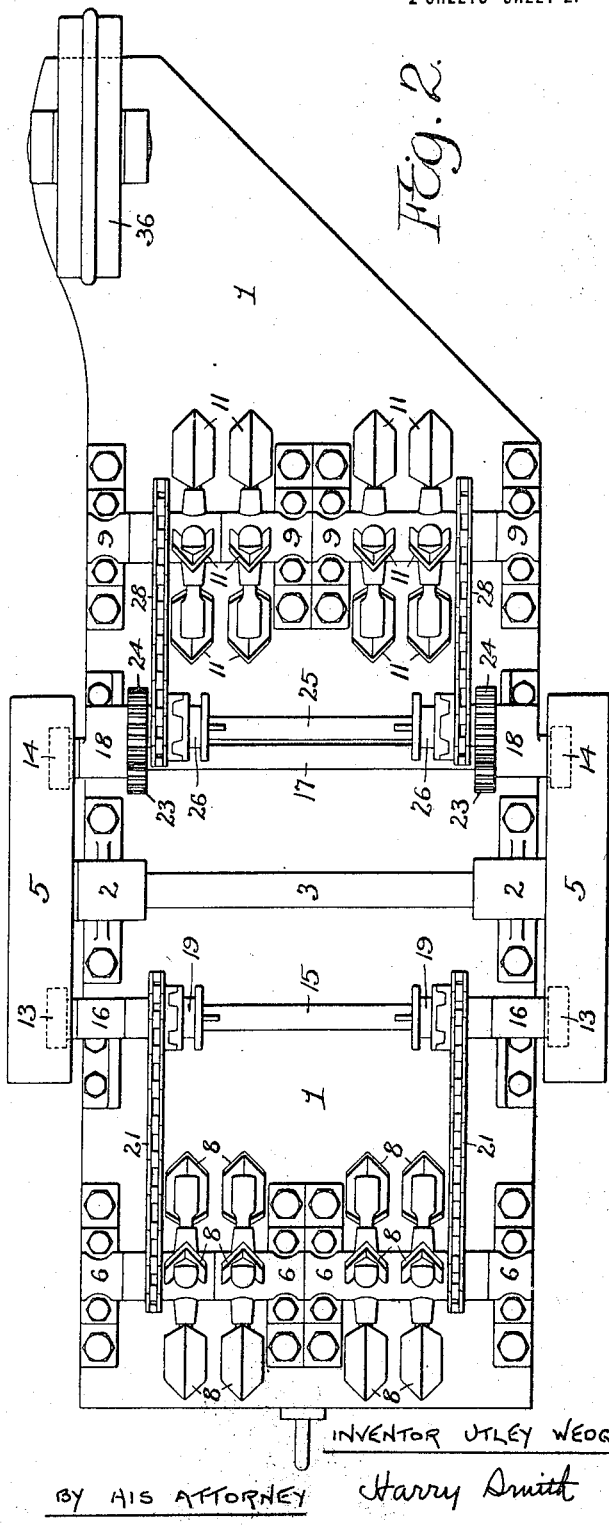
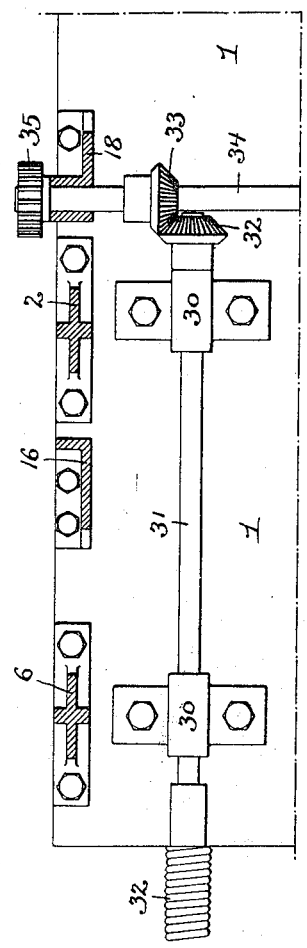
INVENTOR UTLEY WEDGE
BY HIS ATTORNEY
Harry Smith

UNITED STATES PATENT OFFICE.

UTLEY WEDGE, OF ARDMORE, PENNSYLVANIA.

CULTIVATOR.

1,317,533.  Specification of Letters Patent.  Patented Sept. 30, 1919.

Application filed January 22, 1918. Serial No. 213,194.

*To all whom it may concern:*

Be it known that I, UTLEY WEDGE, a citizen of the United States, residing in Ardmore, Pennsylvania, have invented certain Improvements in Cultivators, of which the following is a specification.

My invention relates to that type of agricultural implements used for cultivating the soil (hereinafter, for convenience, referred to as a "cultivator") and has as its object the construction of an implement of this character in such a way that it will insure a more thorough tilling of the soil than is usually the case, and will, owing to its manner of operation, reduce the tractive effort necessary for such operation.

This object I accomplish in the manner hereinafter set forth, reference being had to the accompanying drawings, in which—

Figure 1 is a side view of a cultivator constructed in accordance with my invention;

Fig. 2 is an inverted plan view of the same;

Fig. 3 is a view similar to Fig. 1 but illustrating certain modified features of construction, and Fig. 4 is an inverted sectional plan view of part of such machine on the line 4—4, Fig. 3.

The conventional types of cultivators now in use are those which are equipped either with fixed teeth or blades which tear their way through the soil, or with rotatable disks which not only tear through the soil but are rotated by frictional contact therewith.

My invention consists broadly in providing a cultivator with a pair of rotatable shafts from which project teeth or blades, and in the provision of means whereby these shafts may be rotated in opposite directions so that as the cultivator travels forwardly the teeth or blades projecting from one shaft will cut through the earth rearwardly and the teeth or blades projecting from the other shaft will cut through the earth forwardly thereby securing a double cultivation of the soil, the two cultivations being in opposite directions. Such double cultivation is naturally more efficient than a single cultivation and insures the breaking up of any clods or lumps of soil which may be encountered.

The action of the rearwardly cutting teeth or blades tends to draw the cultivator ahead while the action of the forwardly cutting teeth or blades tends to draw the cultivator rearwardly. If the speed of rotation of the two blade carrying shafts were equal the tractive efforts of the two sets of blades would neutralize one another. If, however, the shaft carrying the rearwardly cutting blades rotates at a greater speed than the other shaft the result will be a constant tendency of the cultivator to travel ahead with the result that less tractive effort will be necessary for the draft of the cultivator. A further feature of my invention comprises the provision of means whereby the shaft carrying the rearwardly cutting blades is caused to rotate faster than the other shaft.

Referring in the first instance to Figs. 1 and 2, my improved cultivator is shown as provided with a frame or platform 1, from which depend hangers for various transverse shafts. Centrally disposed and mounted in hangers 2 is a transverse shaft 3, the opposite ends of which are equipped with traction wheels 5. At the forward end of the cultivator and mounted in hangers 6 is a transverse shaft 7 mounted upon which and projected therefrom are a plurality of sets of cultivating blades 8 which are adapted to dig rearwardly. At the rear end of the cultivator and mounted in hangers 9 is a similar transverse shaft 10, upon which are also mounted and from which likewise project a plurality of sets of cultivating blades 11 which are adapted to dig forwardly.

Attached to each traction wheel 5 is an internal annular rack 12 with which mesh spur pinions 13 and 14. The pinions 13 are secured to the outer ends of a transverse shaft 15 mounted in depending hangers 16 and the pinions 14 are secured to the outer ends of a corresponding transverse shaft 17 mounted in depending hangers 18.

Loosely mounted upon the shaft 15 but engageable therewith through the medium of clutches 19 are a pair of sprocket wheels 20 which are connected, by means of sprocket chains 21, with corresponding sprocket wheels 22 mounted upon the blade-carrying shaft 7.

Mounted upon the shaft 17 is another pair of pinions 23 which intermesh with a pair of pinions 24 loosely mounted upon a shaft 25 which is also supported in the depending hangers 18. The pinions 24 are engageable with the shaft 25 through the medium of clutches 26 and said shaft is provided with a pair of sprocket wheels 27 which are connected, by means of sprocket chains 28, with corresponding sprocket wheels 29 mounted upon the blade-carrying shaft 10.

When the cultivator is drawn forwardly, either by horses or by a tractor, and the sprockets 20 and 27 are clutched to their respective shafts, the rotation of the traction wheels 5 is transmitted, through the medium of the interposed gearing, to the blade-carrying shafts 7 and 10, causing the shaft 7 to rotate counter-clockwise so that the blades 8 projecting therefrom will dig backwardly, and causing the shaft 10 to rotate clockwise so that the blades 11 will dig forwardly.

The size and relation of the various elements of the transmission gearing is such that the shaft 7 will rotate at a faster speed than the shaft 10, with the result that the forward-draft tendency exerted by teeth 8 will more than overcome the rearward-draft tendency exerted by the teeth 11 so that less tractive effort will be necessary to haul the cultivator than if the speed of rotation of the two shafts were equal.

The machine shown in Figs. 1 and 2 is intended to be drawn forwardly by a team of horses, or by a mechanical tractor ahead of it, but in Figs. 3 and 4 I have illustrated a machine in which power is supplied to the shaft 3 so as to rotate the traction wheels 5 and thereby overcome the necessity of providing such draft means. Depending from the frame or platform 1 are a pair of hangers 30 in which is mounted a longitudinal power shaft 31 having its forward end equipped with a flexible joint 32 adapted to engage the rear end of a power shaft of an engine in advance of the cultivator, or the power may be derived from an engine mounted upon the platform 1. At the rear end of the shaft 31 is mounted a bevel gear 32 intermeshing with a bevel gear 33 secured to a transverse shaft 34 mounted in the depending bearings 18. Each end of this shaft 34 is provided with a pinion 35 which engages the internal annular rack 12, so as to drive the traction wheels 5.

The cultivator is preferably provided, at the extreme rear, with a wheel 36 which furnishes an additional point of support, and which, if mounted, as shown, in a yoke formed at the bottom of a vertical post 37 projecting through the platform, may be used as a guide wheel, to steer the cultivator. In this case, the upper part of the post 37 would be provided with a hand wheel, tiller, or other suitable device to enable it to be readily controlled.

While I have illustrated a cultivator having two blade-carrying shafts, one ahead of and one in the rear of the traction wheels, I do not limit myself to this particular construction, as any desired number of blade-carrying shafts may be employed and they may be disposed in any desired way with respect to the traction shaft, so long as some blades dig rearwardly and some dig forwardly and the combined effects of all tend to lessen the tractive effort necessary to cause forward movement of the machine, and instead of applying power to the traction wheels and conveying it from the latter to the blade-carrying shafts, power may be applied to the latter shafts if desired, and the traction wheels may be disconnected therefrom.

I claim:

1. The combination, in a cultivator, of a pair of shafts one having rearwardly cutting blades and the other having forwardly cutting blades, and means for rotating said shafts one in one direction and the other in the opposite direction, said means being such that the shaft having the rearwardly cutting blades thereon will be rotated at a higher rate of speed than the other.

2. The combination, in a cultivator, of a pair of shafts, one having rearwardly cutting blades, and the other having forwardly cutting blades, and means whereby a traction wheel of the cultivator is caused to rotate one of said shafts in one direction and the other in the opposite direction and at a higher speed.

In testimony whereof I have signed my name to this specification.

UTLEY WEDGE.

Copies of this patent may be obtained for five cents each, by addressing the "Commissioner of Patents, Washington, D. C."